United States Patent [19]

Binelli

[11] Patent Number: 5,806,813
[45] Date of Patent: Sep. 15, 1998

[54] TUBING BRACKET ASSEMBLY

[75] Inventor: James C. Binelli, Grand Blanc, Mich.

[73] Assignee: Lab Holding Company, N. Muskegon, Mich.

[21] Appl. No.: 779,277

[22] Filed: Jan. 6, 1997

Related U.S. Application Data

[63] Continuation-in-part of PCT/US96/06419 May 7, 1996.

[51] Int. Cl.[6] ............................................. F16L 3/00
[52] U.S. Cl. ........................... 248/73; 24/20 TT; 403/235; 403/398
[58] Field of Search ........................... 248/73, 74.1, 74.2, 248/74.4, 65, 67.7; 24/20 TT, 20 CN; 403/235, 398, 399

[56] References Cited

U.S. PATENT DOCUMENTS

| | | |
|---|---|---|
| 1,740,765 | 12/1929 | Burnett . |
| 2,283,899 | 5/1942 | Baker ......................................... 248/56 |
| 2,550,001 | 4/1951 | Button ................................... 248/74.4 |
| 2,955,790 | 10/1960 | Sylvester ............................... 248/74.4 |
| 3,310,264 | 3/1967 | Appleton ............................... 248/74.1 |
| 3,366,356 | 1/1968 | Fisher ....................................... 248/56 |
| 3,979,093 | 9/1976 | Madden .................................... 248/56 |
| 4,010,348 | 3/1977 | Salinger .................................... 248/65 |
| 4,377,301 | 3/1983 | Craig et al. .............................. 248/56 |
| 4,557,447 | 12/1985 | Combe ................................. 248/74.1 |
| 4,618,114 | 10/1986 | McFarland .............................. 248/65 |
| 4,783,029 | 11/1988 | Geppert et al. ...................... 248/74.1 |
| 4,973,014 | 11/1990 | Daigle et al. ..................... 248/74.4 X |
| 5,533,696 | 7/1996 | Laughlin et al. ..................... 248/74.2 |
| 5,586,738 | 12/1996 | Binelli ..................................... 248/73 |

FOREIGN PATENT DOCUMENTS

| | | |
|---|---|---|
| 992464 | 10/1951 | France .................................. 403/399 |
| 2166986 | 5/1986 | United Kingdom . |

*Primary Examiner*—Ramon O. Raminez
*Attorney, Agent, or Firm*—Howard & Howard

[57] ABSTRACT

A tubing bracket assembly for use in mounting tubing, particularly round tubing to a support member. The bracket assembly includes a generally C-shaped member with the opposed free ends being interconnected by bridging members. The bridging members are interconnected to a mounting bracket. The clamp is squeezed about a tube so that the bridging member is generally parallel to the centerline of the tube and the bracket is then connected to the bridging members for a secure bracket assembly.

8 Claims, 4 Drawing Sheets

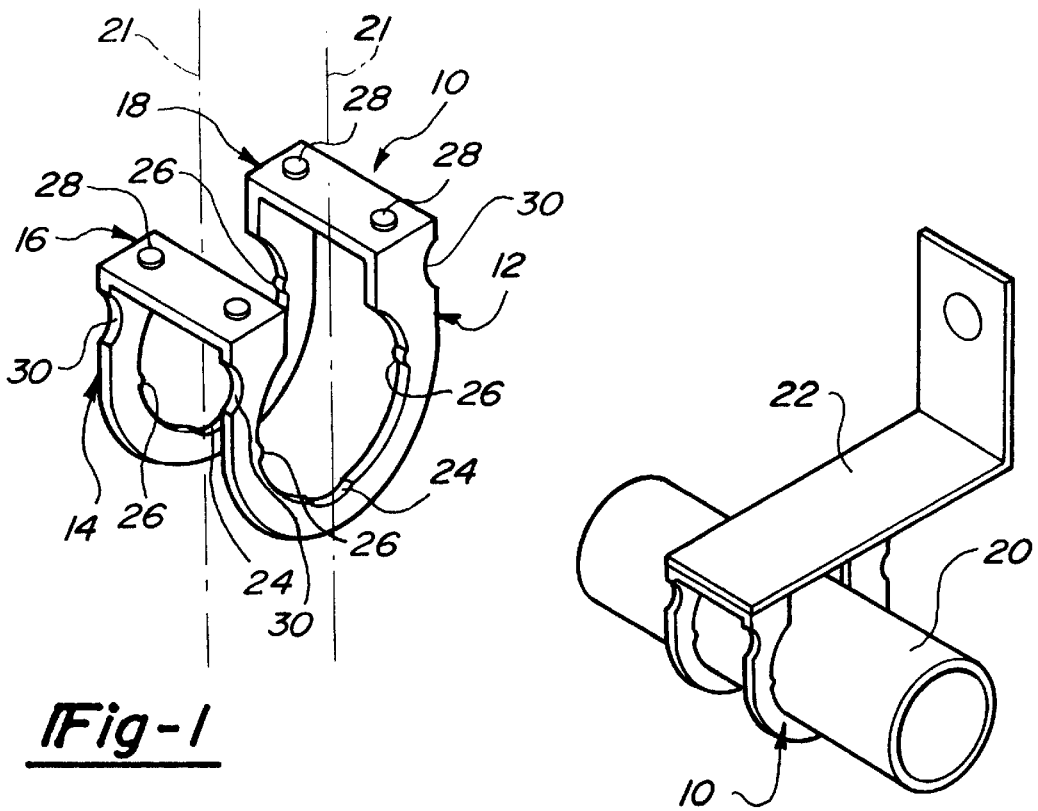
Fig-1
Fig-2
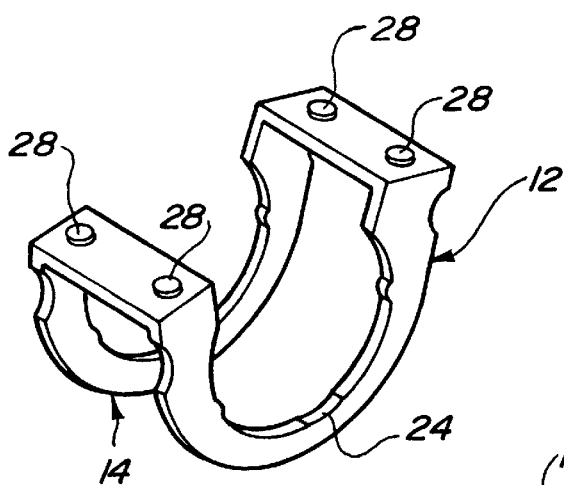
Fig-3
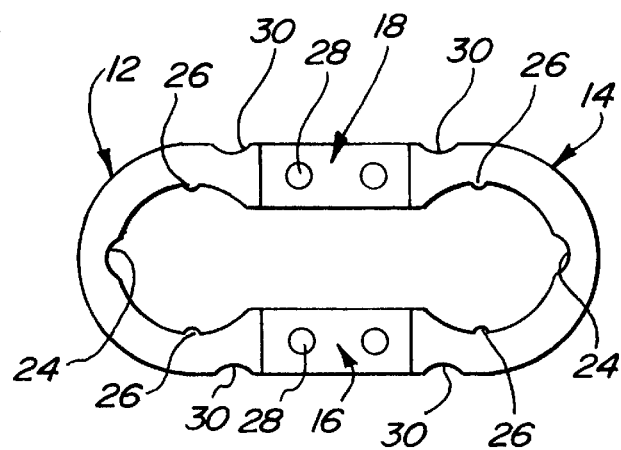
Fig-5

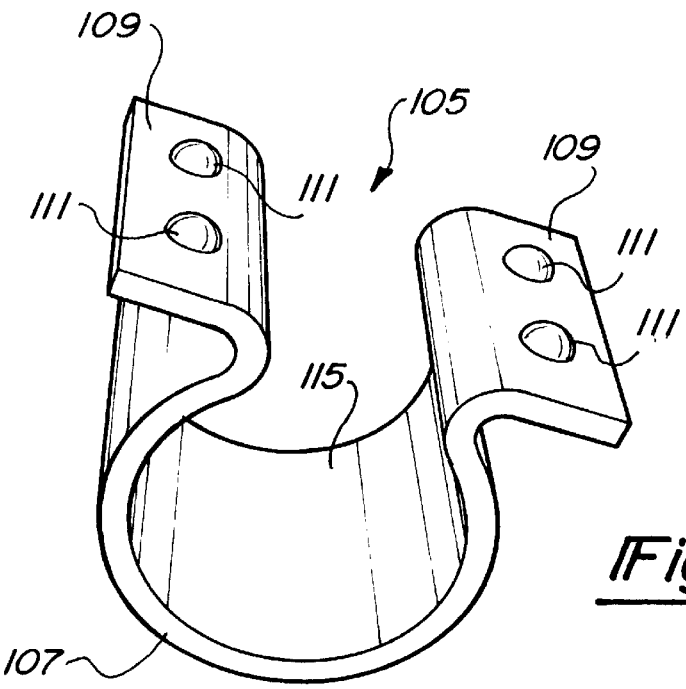
_Fig-7_
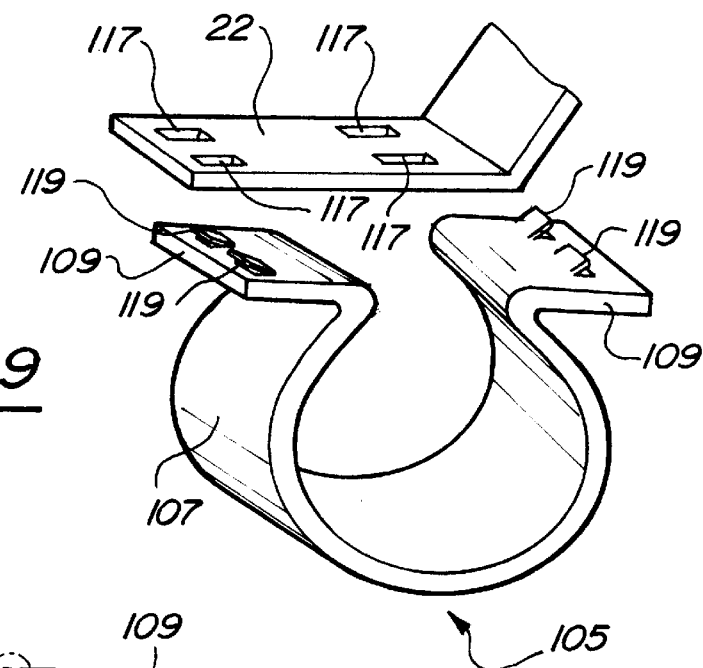
_Fig-9_
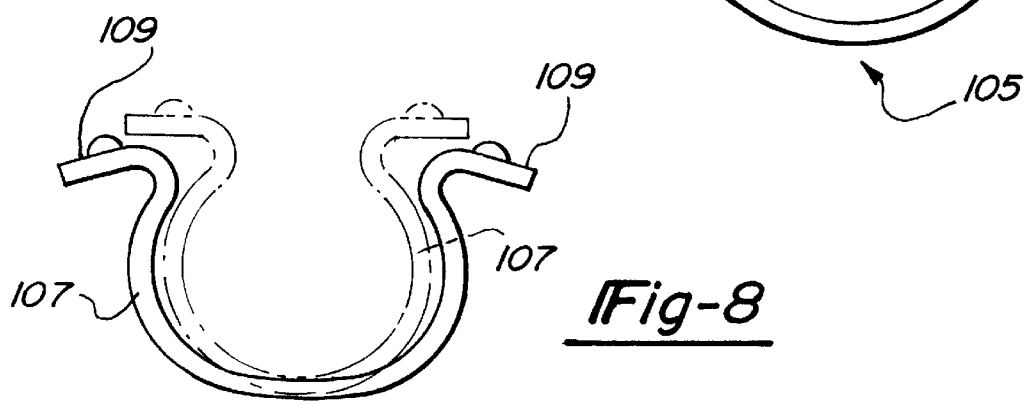
_Fig-8_

TUBING BRACKET ASSEMBLY

This a continuation in part of PCT/U.S. Ser. No. 96/06419, filed on May 7, 1996.

BACKGROUND

The present invention generally relates to a bracket assembly for mounting, for example, rods or tubing to another object, and a method of making the bracket assembly. This invention is particularly advantageous when attaching a bracket to round rods or tubing.

Many products require tubing or rods to be mounted to the product. Typically, the tubing for example is supplied to the product manufacturer as an assembled part with the bracket pre-attached. This allows the product manufacturer to position the tube at the proper location and attach the bracket to the product. As will be appreciated by those of ordinary skill in the art, pre-attached brackets must be properly located on the tube or the tube will not be capable of proper alignment with respect to the product. Further, as will be appreciated by those of ordinary skill in the art, the tube may have numerous bends and require more than one bracket along the tube. This increases the difficulty in attaching the bracket to the tube.

The typical method for mounting a bracket to a tube is to weld the bracket onto the tube. This process requires that the bracket be positioned on the tube at the proper location, held securely at the location and then welded to the tube. This method has several disadvantages. First, the bracket is typically an elongated flat metal piece which may have several bends and twists. A small portion of the bracket, a foot portion, is typically bent at an angle with respect to the remainder of the bracket and is the portion that is welded to the tube. This small portion is curved to approximate the curve of the tube and thereby facilitate attachment to the tube. However the foot portion is difficult to properly locate and, once located, is difficult to retain in the proper position during the welding process. Further, the welding process can cause expansion of the respective parts further enhancing the potential for misalignment. Typically, the bracket has a mounting hole whose centerline must align with the centerline of the tube in order to have a properly attached bracket. As should be appreciated, slight misalignments can result in a defective part requiring the part to be scrapped. With such a small area for use in aligning the bracket, misalignment of the bracket occurs quite easily.

Another disadvantage is that the welding process welds the bracket directly to the tube. As discussed above, the area of the bracket that is welded is a small portion of the bracket and may not be securely attached to the tube, resulting in either a loose bracket or a bracket which can easily be separated from the tube. Again, the result is scrapping of the part. A still further problem is burn-through of the tube during the weld process. Sometimes the weld will burn through the tube causing the tube to be scrapped.

SUMMARY OF THE INVENTION

The present invention overcomes the above problems. The present invention uses a specially designed clamp which is clamped about the tube and has at least one bridge member to which a bracket can be attached. In one embodiment, the clamp has two opposed generally C-shaped engagement rings for engaging the tube to be clamped. The engagement rings include cleats which dig into the tubing to prevent the clamp from rotating on the tubing once it is clamped onto the tubing. With the use of the C-shaped engagement rings, the bracket can be radially and linearly adjusted on the tube to ensure proper alignment.

The two C-shaped engagement rings are bridged by bridging members. Each of the C-shaped engagement rings end in these bridging members. The bridging members when clamped about the tube are generally co-linear with the longitudinal centerline of the tube, which assists in proper alignment. The bridging members have generally planar flat surfaces upon which the bracket is easily mounted. In the preferred embodiment, the bridging members include two weld projections on each bridging member for welding to the brackets. This ensures against loose connections and burn-through problems.

In use, the bridging members are spaced from each other so that the clamp can be positioned about the tube. Once positioned about the tube, the clamp is closed so that the cleats dig into the tube with the bridging members being brought closer together. To facilitate closing, notches are formed in each of the C-shaped members so that the bending can occur about these notches. In the clamped position, this inner diameter of the C-shaped members closely approximates the outer diameter of the tube so that the clamp fits snugly about the tube and cannot rotate. Rotation is further precluded by the cleats digging into the tubing. Once the clamp is clamped about the tube, the bracket can be brought into engagement with the bridging members and welded in place.

In this embodiment, the clamp is manufactured as a single unitary piece. It is typically stamped from a sheet of metal and includes two C-shaped end members interconnected by generally straight flat bridging members. Once the blank is stamped from a piece of metal, the C-shaped end members are bent at generally 90° angles with respect to the bridging members to form the clamp. The bridging members can then be forced apart to a distance slightly greater than the diameter of the tube. This permits the tube to be easily positioned within the clamp. The clamp can then be closed about the tube.

The clamp is installed with an installation tool that includes jaws which engage the clamp and move the clamp forwardly and move the bridge members inwardly so that the clamp actually squeezes the tube. The opposed jaws have concave surfaces for receipt of the clamp and the tube. In use, the clamp is positioned on the curved surfaces of the jaws and then the tube is positioned within the clamp. The jaws are then moved toward the tube, in a generally linear direction and toward the tube in a radial direction to actually place the clamp in tension and to squeeze the clamp about the tube. A vertically reciprocating control bar controls the movement of the jaws which are interconnected to the control bar by connecting links.

Once the clamp is positioned about the tube, the jaws remain in place and the bracket is brought into engagement with the weld projections. Once the bracket engages the weld projections, a welding electrode engages the bracket, and the bracket is welded to the bridge members. Electric leads are connected to the jaws so that current flows from the electrode through the leads and through the clamp and bracket.

In another embodiment of the clamp, the clamp is held in tension about the tube by mechanical locks. In this embodiment, the bracket and the bridge portion have mating tabs and slots. The clamp is tensioned about the tube and the bracket is positioned to align the tabs and slots. Once aligned, the bracket is attached to the clamp, holds the clamp in tension and can be connected to another member.

In a still further embodiment, the clamp is a solid generally C-shaped member instead of two spaced C-shaped members. This solid clamp is connected to the tube or rod in the same manner as described above. As stated above, the clamp and bracket assembly of the present invention provides an efficient and easy way of aligning the bracket on a tube, particularly a round tube. Further, there is no welding of the bracket to the tube so that the tube is not in any way affected by the weld process. The welding occurs between the bracket and the clamp.

Other objects, features and advantages of this invention will become more apparent upon reference to the succeeding, detailed description thereof, and of the drawings illustrating the preferred embodiment of this invention.

DESCRIPTION OF THE DRAWINGS

FIG. 1 is a perspective view of the preferred embodiment of the clamp of the present invention.

FIG. 2 is a perspective view of the bracket and clamp assembly attached to a tube.

FIG. 3 is a perspective view of the clamp of the preferred embodiment in the open position prior to receipt of a tube.

FIG. 5 is a plan view of the clamp of the present invention as it appears when it is cut from metal but prior to it being bent into the final shape of the clamp.

FIG. 7 illustrates a perspective view of a further embodiment of the present invention.

FIG. 8 is a side view of the embodiment of FIG. 7 showing the opening and closing of the clamp.

FIG. 9 is a perspective view of the mechanical connector.

DETAILED DESCRIPTION OF THE INVENTION

Figure 4:
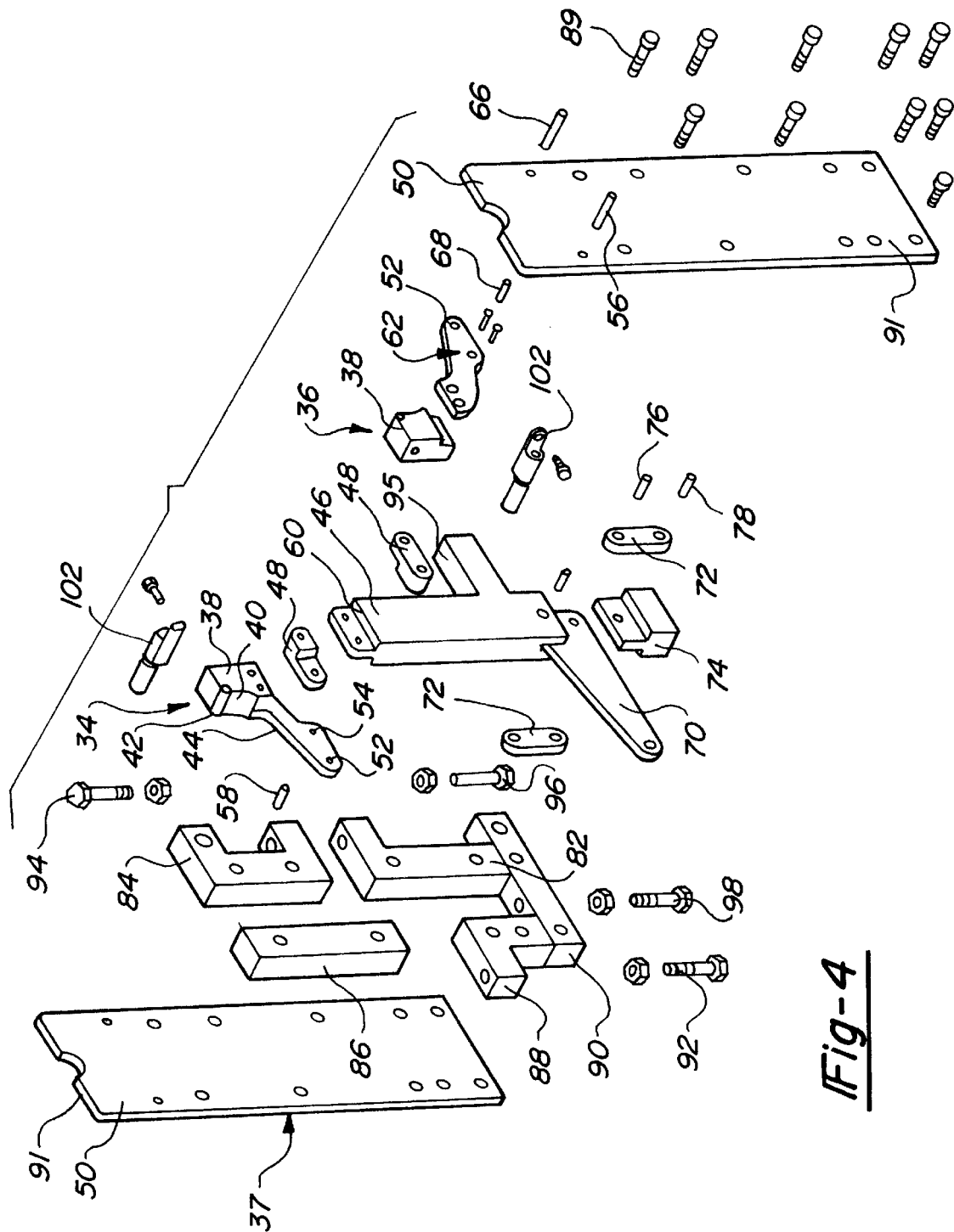
FIG. 4 is a perspective exploded view of the installation tool of the present invention.

With reference to FIG. 1, a first embodiment of the bracket assembly clamp of the present invention is shown generally at 10. The clamp 10 includes two opposed ring members 12 and 14 which are interconnected by bridge members 16 and 18. As illustrated, bridge member 16 bridges the opposed free ends of ring members 12 and 14 and bridge member 18 bridges the other opposed free ends of ring members 12 and 14. The bridge members 16 and 18 are generally perpendicular to the longitudinal centerline 21 of each of the C-shaped ring members 12 and 14. With reference to FIG. 2, it can be seen that the opposed ring members are adapted to encircle a tube 20. Once the ring members encircle tube 20, a bracket 22 can be welded to the bridge members 16 and 18 to form a mounting bracket for tube 20.

Referring again to FIG. 1, each of the opposed ring members 12 and 14 include an indent 24. This indent is positioned along the centerline 21 at about the center of the C-shaped rings to facilitate opening the bridge members as shown in FIG. 3 and closing the clamp 10. The bridge members can be spread apart as shown in FIG. 3 and closed again as shown in FIG. 1 about indent 24.

In the preferred embodiment, rotation of the clamp about the tube is prevented by cleats 26 which are formed along the inner edge of the ring members 12 and 14. As shown, there are two opposed cleats on each ring member 12 and 14. One or more cleats could be used. Further, it will be apparent to those of ordinary skill in the art that the cleats could be eliminated if the application did not require anti-rotation capabilities. In fact, the clamp 10 can be squeezed about tube 20 to prevent most rotation that will be encountered. The cleats 26 ensure against almost any rotation.

Positioned along the bridge member 16 are weld projections 28. The weld projections melt upon the application of electric current to the bracket and clamp. Further, along the exterior of the C-shaped member notches 30 are provided, which facilitate the installation of the clamp. The notices 30 provide positive engagement between the jaws 34 and 36 of the tool 32 and the clamp during installation.

With reference to FIG. 4, the installation tool of the present invention is shown generally at 32. The installation tool includes opposed jaws 34 and 36 which are mounted for pivotal and linear movement with respect to the body 37 of the installation tool 32. Each of the jaws 34 and 36 includes a head portion 38 that has a concave inner surface 40 which ends in a convex portion 42. This convex portion 42 engages the notch 30 of the clamp for positive engagement as the clamp is moved toward and around the tube 20.

Extending from the head portion 38 of each of the jaws 36 and 34 is a connecting arm 44. As illustrated, each of the connecting arms has two spaced apertures 52 and 54 for interconnecting the connecting arm 44 to a pivotal link 48, to the body portion 37, and to a reciprocating control bar 46. With respect to jaw 34, a pin 56 interconnects one side of link 48 to aperture 52 and to the body portion 37. A second pin 58 interconnects connecting arm 44 through aperture 54 to connecting link 48 and control bar 46. The control bar 46 is recessed at 60 to provide clearance for receipt of the link 48 and connecting arm 44. As should be appreciated by those of ordinary skill in the art, with one side of the connecting arm interconnected to the body portion 37 and the other side connected to a reciprocating control bar 46, linear movement of the control bar 46 is translated through link 48 into linear and pivotal movement of jaws 34. The other jaw 36 is connected in the same way to the other side of the body and control bar 46. The other jaw 36 has a connecting arm 62 and a link 48 that are interconnected by pins 66 and 68.

In the illustrated embodiment, the control bar 46 is reciprocated by a control arm 70. The control arm 70 is connected to the control bar 46 by a pin 80. The opposite side of control arm 70 is connected to a base 74 through links 72 and pins 76 and 78. As should be appreciated by those of ordinary skill in the art, the interconnection of control lever 72 to control bar 46 through pivot 72 translates the pivotal movement of arm 70 to vertical movement of bar 46.

In the preferred embodiment, the control bar is guided between guides 82, 84, 86 and 88. These guides are preferably sandwiched between front and back plates 91 of the assembly tool. The plates and guides are secured together by machine bolts 89, as illustrated. In this way, the reciprocal movement of the control bar 46 is contained within guides to ensure its proper reciprocation within the tool.

To provide adjustment to the movement of the jaws 34 and 36, adjusting members are provided. The amount of travel of the control link 70 can be preset by adjustment of bolt 92 which is received within guide 88. Further, the amount of vertical travel of control bar 46 can be preadjusted through adjusting bolts 94 and 96 which engage an adjusting arm 95 which protrudes from control bar 46. Still further, the vertical position of the control bar with respect to the housing can be adjusted by adjusting member 98, which moves base 74.

Figure 6:
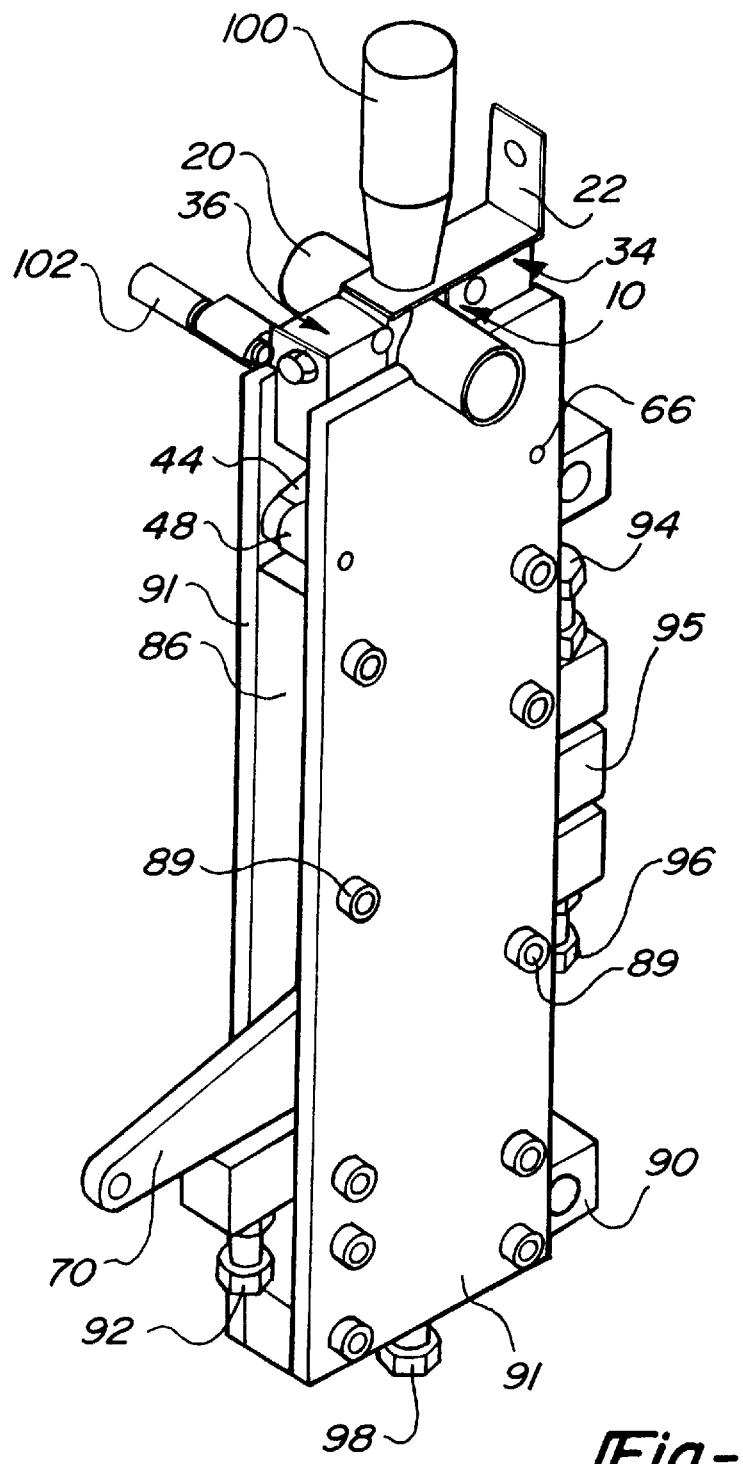
FIG. 6 illustrates the installation tool and electrode during the welding process of the bracket to the clamp.

Referring now to FIGS. 4 and 6, leads 102 are connected to the heads 38 of the jaws 34 and 36. An electrode 100 is also illustrated which can be moved into engagement with the bracket assembly once the clamp 10 has been clamped about tube 20.

In operation, the assembly tool illustrated in FIG. 4 is opened for receipt of clamp 10 (see FIG. 3). To open the assembly, control lever 70 is raised to pull control bar 46 downwardly to open the jaws 34 and 36. With the jaws 34 and 36 open, clamp 10, as illustrated in FIG. 3, can be inserted into the jaws to engage the curved inner surfaces of the jaws. A tube 20 is then positioned in clamp 10 and lever 70 is depressed. Depressing lever 70 causes control bar 46 to move upwardly with respect to the body 37, closing jaws 34 and 36 about clamp 10. As indicated previously, jaws 34 and 36 move linearly in the direction of the tube, as well as radially about the tube to squeeze clamp 10 about the tube 20. The cleats 26 dig into the tube to prevent rotation of the clamp with respect to the tube. After the jaws 34 and 36 have been fully closed, the bracket 22 is brought into engagement with the bridging members 18. Once positioned, electrode 100 is brought into engagement with the face of bracket 22 and bracket 22 is welded through weld projections 28 to clamp 10 for a secure bracket attachment.

With reference to FIG. 5, the method of making clamp 10 of the present invention is illustrated. The clamp is formed from a flat stock of material, preferably metal. As can be seen, the clamp is cut from a flat sheet in a generally oval configuration. The ring members 12 and 14 are on the ends and are interconnected by bridge members 16 and 18. The indents 24 on the inner wall of the rings and the notches 30 are cut into the outer walls of the ring. Further, the weld projections 26 are formed in the bridge member 16. Once the flat blank illustrated in FIG. 5 is formed, the rings are folded along imaginary fold lines 35 until they are generally perpendicular to the bridge members 16 and 18. In this way, the clamp can be easily and economically formed to the shape illustrated in FIG. 1. After the clamp 10 is formed, it can then be separated as illustrated in FIG. 3. In the alternative, the flat blank can be formed with the bridge members separated as shown in FIG. 3 and then squeezed together by the installation tool illustrated in FIG. 4 to the shape shown in FIGS. 1 and 2.

With reference to FIG. 7, a further embodiment of the present invention is generally shown at 105. Clamp 105 has a generally C-shaped body 107 which terminates in outwardly extending tabs 109. The tabs 109 include weld projections 111 to facilitate the welding of a bracket 22 to the clamp 105. In the disclosed embodiment, the inner surface of the body 107 is knurled at 115 to resist twisting of the clamp 107 about the member to which it is attached. Although not illustrated, the body 107 could include an indent 24 to facilitate bending of the clamp 107. Further, the clamp could include cleats 26, instead of the knurling 115.

The clamp 105 could be installed by welding in the same manner as discussed previously with clamp 10. With reference to FIG. 8, the clamp body 107 can be spread apart to position the clamp about a tube or rod. The spread position of clamp 105 is shown in the solid lines of FIG. 8. Once positioned about the tube or rod, the body can then be squeezed together and placed in tension. This is generally shown in the phantom lines in FIG. 8. While the body is tensioned, the bracket can be welded to the tabs 109.

In a further embodiment, the tabs can be held together by mechanical connections. FIG. 9 illustrates clamp 105 which has been adapted for mechanical connection. It should be understood by those of ordinary skill in the art that the same mechanical connection illustrated in FIG. 9 could be used with the clamp 10 illustrated in FIGS. 1–6. In this embodiment, the bracket 22 has slots 117 which are adapted to mate with projections 119 formed in tabs 109. In this embodiment, the clamp 105 is spread apart to fit around the rod or tube and then squeezed together to place clamp 105 in tension and to grip the tube or rod. The bracket 22 is then mated with tabs 119 to mechanically lock clamp 105 about the tube or rod.

While the invention has been shown and described in its preferred embodiment, it will be clear to those skilled in the art to which it pertains that many changes and modifications may be made thereto without departing from the scope of the invention.

What is claimed:

1. A clamp for clamping a first member to a second member, said clamp comprising:

an engagement member to engage the first member, said engagement member having a body portion to partially surround said first member, said body portion ending in opposed ends which are adapted to be drawn together to create tension within said body portion and cause said body member to grip said first member;

a bracket to maintain tension in said body portion and lock said body portion about said first member, said bracket being connected to said opposed ends, and said bracket extending from said opposed ends for connection to said second member.

2. The clamp of claim 1, wherein said body portion has a longitudinal width which is greater than the lateral width of said body portion and said ends extend along said longitudinal body width.

3. The clamp of claim 1, wherein said opposed ends include connecting means for connecting said bracket to said opposed ends.

4. The clamp of claim 1, wherein said clamp includes a notch generally opposite said opposed ends about which said body portion can be spread apart so that said body portion can be opened for positioning about said first member and squeezed together to engage said first member.

5. The clamp of claim 1, further including at least one cleat on said body portion for engaging said fist member to prevent relative movement between said clamp and said first member.

6. The clamp of claim 1, wherein said opposed ends include weld projections for welding said bracket to said opposed ends.

7. The clamp of claim 1, wherein said opposed ends and said bracket include mating tabs to mechanically hold said engagement member in tension about said first member.

8. The clamp of claim 1, wherein said engagement member is generally C-shaped.

* * * * *